US011204108B2

(12) United States Patent
Syed et al.

(10) Patent No.: US 11,204,108 B2
(45) Date of Patent: Dec. 21, 2021

(54) APPARATUS AND METHOD FOR SONAR IMAGING AND MANAGING OF UNDERSEA CABLE LAYING

(71) Applicant: CODA OCTOPUS GROUP INC., Orlando, FL (US)

(72) Inventors: Alam Abbas Syed, Orlando, FL (US); Blair Cunningham, Orlando, FL (US)

(73) Assignee: CODA OCTOPUS GROUP INC., Orlando, FL (US)

(*) Notice: Subject to any disclaimer, the term of this patent is extended or adjusted under 35 U.S.C. 154(b) by 0 days.

(21) Appl. No.: 16/362,255

(22) Filed: Mar. 22, 2019

(65) Prior Publication Data
US 2020/0347961 A1 Nov. 5, 2020

(51) Int. Cl.
 F16L 1/235 (2006.01)
 G01S 15/89 (2006.01)
 G01S 15/00 (2020.01)
 F16L 1/19 (2006.01)
(52) U.S. Cl.
 CPC .......... F16L 1/235 (2013.01); F16L 1/19 (2013.01); G01S 15/003 (2013.01); G01S 15/89 (2013.01)
(58) Field of Classification Search
 None
 See application file for complete search history.

(56) References Cited

U.S. PATENT DOCUMENTS

| 4,164,379 A * | 8/1979 | Denman ............... F16L 1/235 405/158 |
| 2004/0013471 A1 * | 1/2004 | Matthews ............. G01S 15/89 405/154.1 |
| 2013/0094910 A1 * | 4/2013 | Giles .................... F16L 1/203 405/166 |

FOREIGN PATENT DOCUMENTS

NL 8301898 * 11/1983

OTHER PUBLICATIONS

Sarrionandia De León, "Under Water Mapping Using Sonar," Universidad De Las Palmas De Gran Canaria, Escuela de Ingeniería Informática, Bachelor Thesis, 89 pgs. (Sep. 14, 2015).
Massot-Campos et al., "Optical sensors and methods for underwater 3D reconstruction," Sensors, 15(12): 31525-31557 (2015).
Thales, "Submarine high frequency active sonar for own ship safety and tactics," accessed on-line on the Internet at: https://www.thalesgroup.com/en/worldwide/defence/moas-mine-obstacle-avoidance-sonar (Aug. 2016).

* cited by examiner

*Primary Examiner* — Sean D Andrish
(74) *Attorney, Agent, or Firm* — Barnes & Thornburg LLP

(57) ABSTRACT

A portion of a line from a line laying vessel to a touchdown support point on or near to the seabed is imaged with a 3 dimensional sonar imaging system to produce coordinates of a series of touchdown points using a time sequence of sonar images, and the time series of touchdown points is recorded.

21 Claims, 3 Drawing Sheets

APPARATUS AND METHOD FOR SONAR IMAGING AND MANAGING OF UNDERSEA CABLE LAYING

FIELD OF THE INVENTION

The field of the invention is the field of capturing and manipulation of data from sonar signals scattered from sparse objects immersed in a fluid. The field of the invention includes visualization and treatment of raw data to give more accurate information than mere visualization.

RELATED PATENTS AND APPLICATIONS

The following US Patents, US provisional and non-provisional patent applications are related to the present application: U.S. Pat. No. 6,438,071 issued to Hansen, et al. on August 20; U.S. Pat. No. 7,466,628 issued to Hansen on Dec. 16, 2008; U.S. Pat. No. 7,489,592 issued Feb. 10, 2009 to Hansen; U.S. Pat. No. 8,059,486 issued to Sloss on Nov. 15, 2011; U.S. Pat. No. 7,898,902 issued to Sloss on Mar. 1, 2011; U.S. Pat. No. 8,854,920 issued to Sloss on Oct. 7, 2014; and U.S. Pat. No. 9,019,795 issued to Sloss on Apr. 28, 2015; U.S. patent application Ser. Nos. 14/927,748 and 14/927,730 filed on Oct. 30, 2015, Ser. No. 15/978,386 filed on May 14, 2018, Ser. No. 15/908,395 filed on Feb. 28, 2018, and Ser. No. 15/953,423 filed on Apr. 14, 2018 by Sloss, and 62/818,682 filed Mar. 14, 2019 by Abbas are also related to the present application. The above identified patents and patent applications are assigned to the assignee of the present invention and are incorporated herein by reference in their entirety including incorporated material.

OBJECTS OF THE INVENTION

It is an object of the invention to improve the laying of an undersea cable using sonar data collection and manipulation. It is an object of the invention to control the motion of a cable laying vessel using sonar data.

SUMMARY OF THE INVENTION

One or more large arrays of sonar detectors is used to produce three dimensional sonar images of a seabed and a cable running from a moving cable laying vessel to a touchdown point on the seabed. The seabed is imaged along a portion of a path from the touchdown point which the cable is predicted to follow as it lays down on the seabed. The path is imaged far enough in front of the touchdown point to allow time for signals to be sent to the cable laying vessel to change the predicted path to avoid objects which would adversely affect the laying of the cable. The cable is measured and a mathematical curve describing the cable is constructed, which may then be compared to a theoretical catenary curve generated using the measured tension in the cable and the 3 dimensional coordinates and two rotational coordinates of the cable as the cable enters the water. Differences from the catenary curve caused by currents, waves, the rolling and pitching of the cable laying vessel can be used to more accurately predict the cable along a prescribed track.

DETAILED DESCRIPTION OF THE INVENTION

It has long been known that data presented in visual form is much better understood by humans than data presented in the form of tables, charts, text, etc. However, even data presented visually as bar graphs, line graphs, maps, or topographic maps requires experience and training to interpret them. Humans can, however, immediately recognize and understand patterns in visual images which would be difficult for even the best and fastest computers to pick out. Much effort has thus been spent in turning data into images. In particular, images which are generated from data which are not related to light are often difficult to produce and often require skill to interpret. One such type of data is sonar data, wherein a sonar signal pulse is sent out from a generator into a volume of fluid, and reflected sound energy from objects in the insonified volume is recorded by one or more detector elements. The term "insonified volume" is known to one of skill in the art and is defined herein as being a volume of fluid through which sound waves are directed. In the present invention, a sonar signal pulse of sound waves called a ping is sent out from a sonar ping generator which insonifies a roughly conical volume of fluid.

The field of underwater sonar imaging is different from the fields of medical ultrasonic imaging and imaging of underground rock formations because there are far fewer surfaces in the underwater insonified volume.

This application uses raw data to make more accurate measurements than can be measured from the visual representations of the sonar data.

Figure 1:
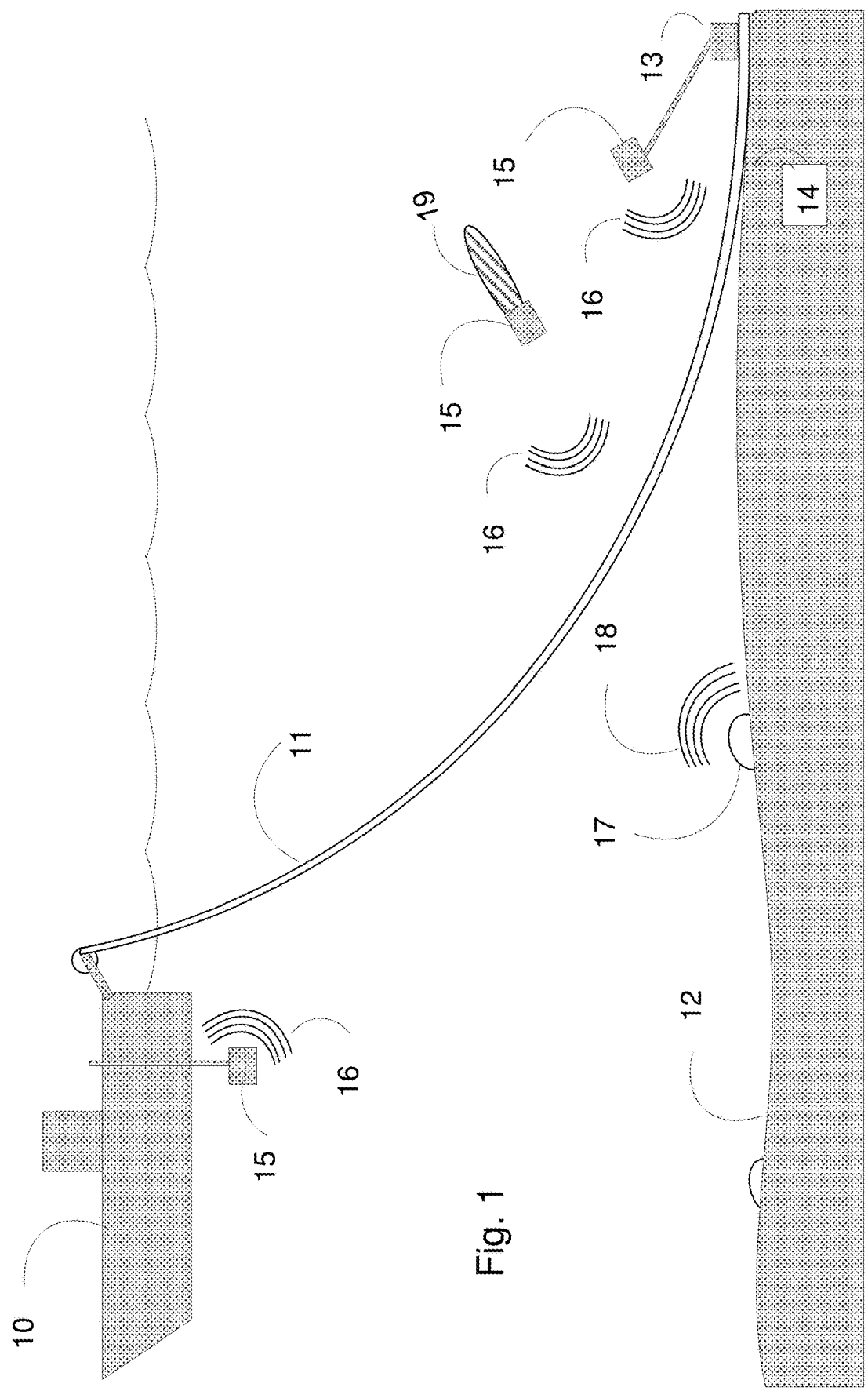
FIG. 1 shows of a cable laying vessel laying cable to a sea bed.

FIG. 1 shows a sketch of a cable laying vessel 10 dropping a cable 11 to a seabed 12. An optional trenching tool 13 carves a trench (not shown) in the seabed 12 to receive cable 11. As the cable laying vessel 10 moves, cable 11 spools off the vessel 10 and touches down on the seabed 12 at a touchdown point 14. The touchdown point moves approximately with the same velocity as the cable laying vessel. As the vessel 10 moves, the cable may touch down at a series of touchdown points which form a continuous line on the bottom of the seabed. If the seabed is not flat enough (not shown), the touchdown points may be separated with the cable suspended in the sea between two touchdown points. Alternatively, the cable may pass over (not shown) a part of the apparatus 13 for digging the trench without touching the seabed and descend directly to a first touchdown point on the bottom of the trench (pre-trenching). Alternatively, the cable may lay on the seabed for some distance, and then the cable may be picked up from the seabed by an apparatus attached to or detached from the trenching tool 13 and passed over the trenching tool to the bottom of the trench made by the trenching tool (post-trenching).

In all cases, it is important to control the track of the cable either on the seabed or in the trench so that the cable does not run into obstacles such as object 17 which interfere with the operation of the trenching tool or cause the cable to deform past acceptable limits. Such obstacles could be boulders with dimensions greater than a defined dimension, ship wrecks or other objects discarded from the surface, etc. Unless obstacles are identified well before the cable touches down, the cable laying ship has to stop, or worse, back up and try again.

Ultrasonic sonar generators or ping generators 15 suspended in the water emit ultra sonic sound waves 16 are which strike objects such as the cable 11 and objects 17 on the seafloor. The ultrasonic ping generators 15 are attached to or are in proximity to large array multielement sonar receivers (not shown) for receiving reflected sonic waves.

The sonar generators and multielement sonar detectors 15 may be attached to or in a known location in proximity to one or more of the cable laying vessel 10, to the trenching apparatus 13, or to one or more mobile underwater probes 19. Sound waves 18 are shown reflected from object 17 back towards the one or more multielement sonar detectors 15. Object 17 may be suspended in the water, lying on the seabed 12, or be buried in the sea bed 12.

The ultrasonic multielement sonar detectors 15 measure the phase, intensity, and arrival time of the reflected sonar pings 18. The phase, intensity, and arrival time data are processed to provide three dimensional location data measuring sonar reflecting surface locations of portions of the cable 11 at one or more locations such as when the cable 11 enters the water, when the cable 11 is approximately midway between the seabed and the surface of the water, when the cable 11 touches down on the sea bed, or when the cable 11 is passed over the trenching tool. The seabed 12 surface and the object 17 surface are similarly measured to give three dimensional location data of the reflecting surfaces. Since the cable is known to have a known circular cross section, the position of the center of the cable may be accurately calculated from the received sonar data, and the shape of the cable calculated throughout the field of view of the sonar detection system.

The shape of the cable 11 having a defined mass per unit length is described by well known catenary curves if the cable is static and supported with known tension forces at known points such as a point on the ship and a point on the seabed. However, as the ship moves and the cable is dragged through the water or subjected to currents and unregulated motions of the ship, the shape of the cable 11 may differ significantly from the theoretical curve since the drag and the tension are hard to measure. Measurements made by the sonar detectors 15 may replace or may be used to modify the theoretical shape of the cable 11. The measured or adjusted sonar shape is used to more accurately predict the touchdown points as the vessel moves. If the predicted track of the touchdown points of the cable 11 runs too close to an obstacle such as obstacle 17, a command signal may be sent to the vessel 10 to alter the cable laying conditions. Possible conditions to alter include, but are not limited to: course and/or speed of the vessel, tension in the cable, the rate that the cable is fed into the water, etc. The new conditions will lay the cable on an altered track, where the altered track is chosen according to one or more criteria. One example of such a criterion is the criterion that the radius of curvature of the cable track should be greater than a defined radius of curvature at any point in the track.

A series of outgoing ping pulses may be sent out with an outgoing ping frequency $P_f$. A sonar ping generally has a constant sound frequency f. (The frequency f is sometimes changed in the prior art during the ping in a method called a chirped pulse ping, where the pulse frequency either increases or decreases monotonically throughout the pulse.) A master oscillator (not shown) produces a square wave voltage output at frequency f, and the ping generator uses the master oscillator to produce outgoing sinusoidal sound waves in phase with the master oscillator.

The reflected sound waves 18 are received by each detector element one or more of the large multielement sonar detector arrays associated with each ping generator 15. The detector arrays measure the pressure vs time of the reflected ping sound waves at each element and return an analog electrical voltage signal representing the amplitude versus time of the sound wave impinging on the element. The electrical voltage signals are digitally sampled at precisely known times with respect to the phase of the sent out sound waves of each ping. A large array multielement detector is preferably constructed with 24 by 24 or more sonar detector elements arranged orthogonally as a square grid. A two dimensional sonar detector array which has m by n elements, where m and n are different integers will have different angular resolutions in two orthogonal angles.

Figure 2:
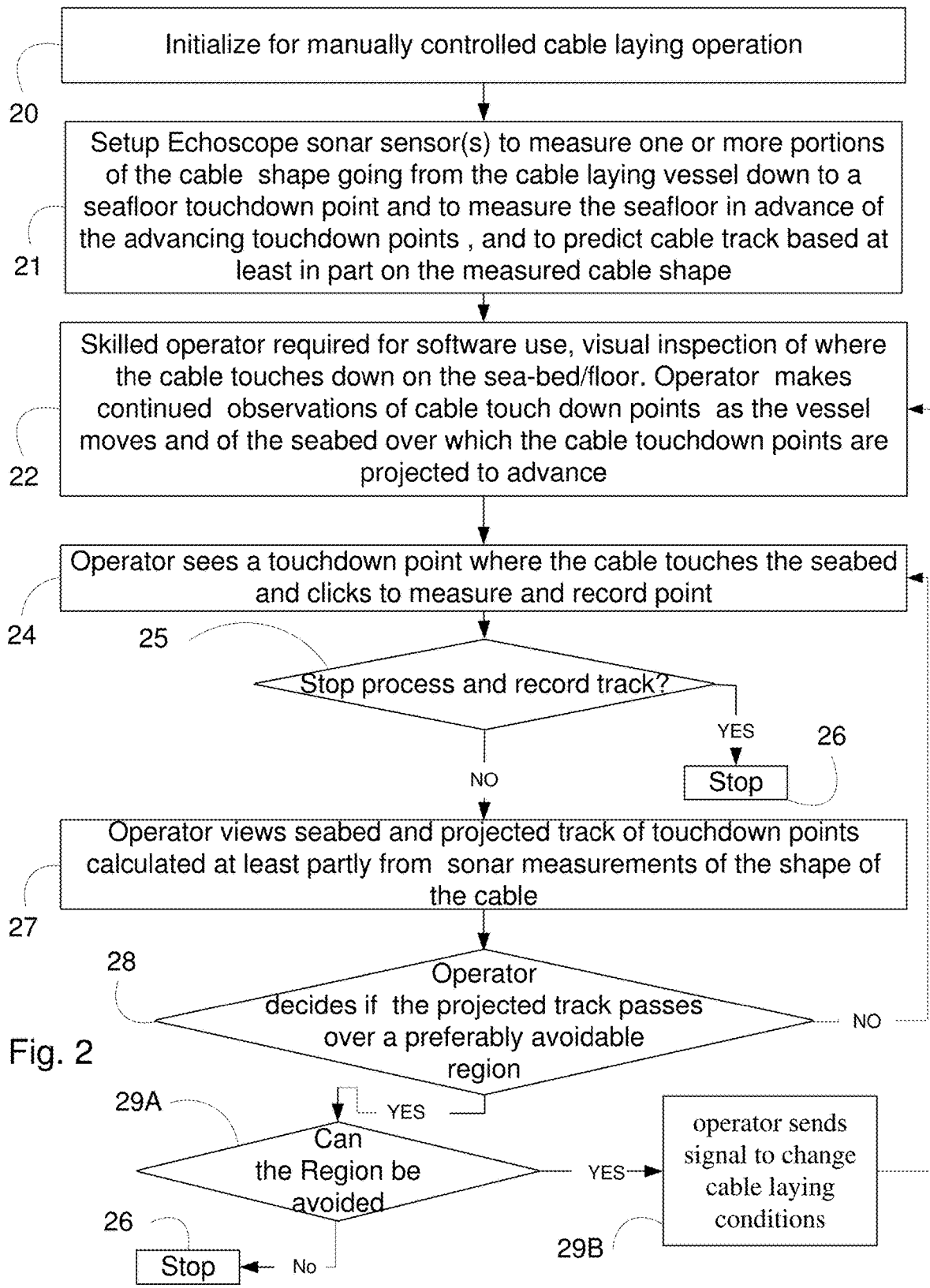
FIG. 2 shows a flow chart of a manually controlled cable measuring system.

The attenuation of the sent out and received sonar signals is dependent on the sent out frequency $P_f$. As the frequency $P_f$ increases, the sonar resolution increases and the detection range decreases. The frequency $P_f$ may be changed from ping to ping to either see further at the expense of resolution, or to see more detail of the closer sound reflecting objects. A skilled operator is needed for manual control of the ping frequency $P_f$, or an computer programmed to change frequency $P_f$ according to a criterion, such as the need for higher resolution or greater range The amount of raw digital data generated by large array sonar detectors is often too great either to transmit to the surface vessel from the array detector or to store for later analysis. This is especially true for independently operated probes without high speed data connections to the cable laying vessel 10. In these cases, the raw data must be analyzed close to the detector, so that command signals sent to the control vessel may be sent by low bandwidth means such as sound waves FIG. 2 shows a flow chart for manually carrying out the method of the invention. A skilled operator is usually carried by the cable laying vessel 10. The cable laying operation is initialized for manual operation in step 20. Operator sets up ping generators and their associated sonar detectors such as an Echoscope® system to measure one or more portions of the cable shape going from the cable laying vessel down to a seafloor touchdown point, or the seafloor in advance of the advancing touchdown points, and to predict cable track based at least in part on the measured cable shape in step 21. In step 22, a skilled operator operates software and hardware, and visually inspects the sonar images to see where the cable touches down on the sea-bed/floor. Operator makes continued observations of cable touch down points as the vessel moves and of the seabed over which the cable touchdown points are projected to advance. In step 24, Operator sees a touchdown point where the cable touches the seabed and clicks to measure and record touchdown point location. In step 25, operator decides whether to stop the process and record track (step 26) or to continue to step 27 and continue to view the seabed and projected track of touchdown points calculated at least partly from sonar measurements of the shape of the cable. The operator is trained to view the seabed and projected track of the cable and decide whether the projected track passes through a region of the seabed which is preferably avoided. If no such region is recognized, in decision step 28 the operator returns to step 24 and continues the process. If such a region is recognized, the operator sends signal to the cable laying vessel to change cable laying condition to avoid a preferably avoidable region or to stop if the region can not be avoided 29A. The cable is usually laid on a preplanned route, and it is important check to see whether the cable is deviating from the preplanned route 29B.

Figure 3:
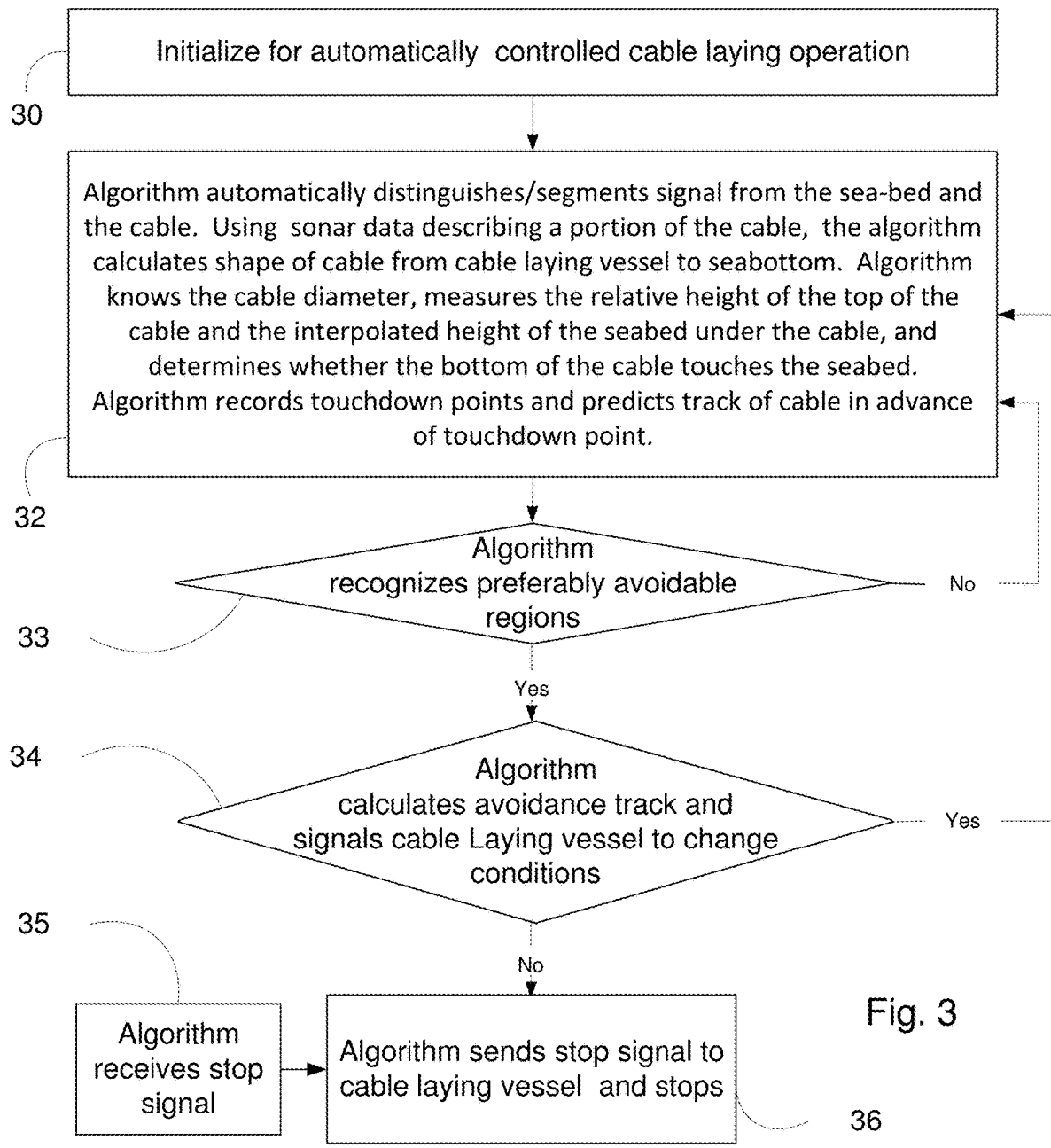
FIG. 3 shows a flow chart of an automatically controlled cable measuring system.

FIG. 3 shows a flow chart for automatically carrying out the method of the invention. A skilled operator is usually carried by the cable laying vessel 10, but manual operation is tedious and subject to operator error and inattention. Usually, manual operation is possible since the sonar ping generators and sonar receivers are attached to the cable laying ship by a fast communication line. However, a remotely operated probe will usually not have enough bandwidth to send sufficient data to the surface to carry out the invention and so the method of the invention must be carried out automatically. The automatic cable laying operation is initialized in step 30.

The algorithm automatically distinguishes/segments signals from the sea-bed and the cable. Using sonar data describing one or more portions of the cable, the algorithm calculates shape of cable from cable laying vessel to seabottom. The algorithm knows the cable diameter, measures the relative height of the top of the cable and the interpolated height of the seabed under the cable, and determines whether the bottom of the cable touches the seabed in step 32. The algorithm records touchdown points and predicts track of cable in advance of touchdown point in step 33. The algorithm also recognizes preferably avoidable regions in step 33. The algorithm calculates an avoidance track and signals the cable laying vessel to change conditions in step 34 if the preferably avoidable region can be avoided. If there is no such track the algorithm sends a stop signal to the cable laying vessel in step 36 and stops. In step 35 the algorithm receives a stop signal from an exterior source which also triggers the stop signal in step 36.

Obviously, many modifications and variations of the present invention are possible in light of the above teachings. It is therefore to be understood that, within the scope of the appended claims, the invention may be practiced otherwise than as specifically described.

We claim:

1. A method of laying an undersea line, comprising:
   imaging a portion of the undersea line supported by a line laying vessel laying the undersea line from the vessel to a seabed, wherein the undersea line has touched down at a support point on or near to the seabed, wherein the seabed, the support point on or near to the seabed, and a portion of the line rising from the support point towards the line laying vessel are imaged with a real-time 3 dimensional (3D) sonar imaging system, wherein the 3D sonar imaging system uses an array of sonar detectors;
   tracking coordinates of a series of touchdown points in real-time using a time sequence of the imaged portion of the undersea line;
   calculating a series of three dimensional points along the undersea line rising from the seabed for each image to describe a three dimensional shape of the portion of the undersea line rising from the seabed;
   comparing the series of three dimensional points to a second set of three dimensional points calculated from a theoretical model of a shape of the undersea line;
   calculating, from sonar measurements of a shape of the undersea line and the 3D real-time images, a projected track of a plurality of predicted touchdown points;
   presenting the projected track;
   upon identifying an obstacle in the imaged portion of the undersea line, computing a change in line laying conditions to avoid the obstacle; and
   sending a command signal to the vessel to alter the line laying conditions based on the change, wherein the command signal comprises altering a speed of the vessel.

2. The method of claim 1, wherein
   the undersea line is chosen from at least one of a marking line, an electrical cable for carrying significant electrical power, a communications line for carrying information, and a pipeline for carrying a fluid.

3. The method of claim 1, wherein the projected track of the plurality of predicted touchdown points is based at least in part on the measured undersea line shape.

4. The method of claim 1, wherein the command signal to the vessel further alters a course of the vessel.

5. The method of claim 1, wherein the command signal to the vessel further alters a tension in the undersea line.

6. The method of claim 1, wherein the command signal to the vessel further alters a rate that the undersea line is fed into the seabed.

7. A method of laying undersea cable, comprising:
   automatically imaging a portion of a cable supported by a cable laying vessel laying the cable from the vessel to a seabed, wherein the cable has touched down and is being supported at a touchdown point on or near the seabed and lies supported at the touchdown, wherein the seabed and the portion of the cable rising from the seabed towards the cable laying vessel are imaged with a three dimensional sonar imaging system, the sonar imaging system using an array of sonar detectors;
   automatically tracking the coordinates of a series of touchdown points and the seabed using a time sequence of the imaged portion of the cable;
   automatically recording a time series of touchdown points from the tracked coordinates;
   automatically calculating a series of three dimensional points along the cable rising from the seabed for each image to describe the three dimensional shape of the portion of the cable rising from the seabed;
   automatically comparing the series of three dimensional points to a second set of three dimensional points calculated from a theoretical model of a shape of the cable;
   automatically calculating a probable future track of touchdown points using the recorded time series of touchdown points the calculated series of three dimensional points;
   upon identifying an obstacle in the imaged portion of the cable, computing a change in cable laying conditions to avoid the obstacle; and
   sending a command signal to the cable laying vessel to alter the cable laying conditions based on the change, wherein the command signal comprises altering a speed of the cable laying vessel.

8. The method of claim 7, further comprising:
   automatically controlling the cable laying vessel according to a criterion.

9. The method of claim 7, further comprising:
   automatically imaging the seabed and the touchdown point of the portion of the cable on the seabed; wherein the seabed and the cable touchdown point three dimensional images are calculated at a rate of more than 5 images per second.

10. The method of claim 9, wherein a plurality of positions of the touchdown points are automatically recorded.

11. The method of claim 7, further comprising:
    automatically imaging a portion of the cable near a surface of a sea carrying the cable laying vessel; and
    automatically calculating coordinates of future touchdown points of the cable.

12. The method of claim 7, further comprising:
    automatically analyzing the probable future track of the touchdown points.

13. The method of claim 7, wherein the command signal to the vessel further alters a course of the vessel.

14. The method of claim 7, wherein the command signal to the vessel further alters a tension in the cable.

15. The method of claim 7, wherein the command signal to the vessel further alters a rate that the cable is fed into the seabed.

16. A method of laying a subsea cable, comprising:
automatically directing a first series of one or more pulsed sonar energy beams into a fluid, wherein the first series of one or more pulsed sonar energy beams is produced by a pulsed sonar energy beam producer in communication with a volume of fluid, and wherein the volume of fluid contains a cable suspended between a first support point on or near a seabed and a second support point at or near a surface of a sea;
automatically receiving pulsed sonar energy signals reflected or scattered from a portion of the seabed near the first support point and from a portion of the cable near the first support point where the cable lifts off from the first support point and rises towards the second support point near the sea surface, wherein the received energy signals are received by a pulsed sonar energy receiver, and wherein each of a first series of pulsed energy beams produces received signals at different times when portions of the cable and seabed are at differing distances from either or both the pulsed energy beam producer and the energy receiver;
automatically analyzing a time of flight of each of the reflections or scattering of the first series of received pulsed energy signals, wherein the analysis is performed with a first analysis method;
automatically calculating 3 dimensional images of the portion of the cable and the portion of the seabed from the analysis, wherein automatically calculating the 3 dimensional images comprises automatically calculating a series of three dimensional points along the cable rising from the seabed for each image, to describe the three dimensional shape of the portion of the cable rising from the seabed;
automatically comparing the series of three dimensional points to a second set of three dimensional points calculated from a theoretical model of a shape of the cable;
automatically tracking touchdown points of the cable as the cable is paid out from a moving cable laying vessel past the second support point, wherein the second support point is moving approximately a same velocity as the cable laying vessel,
automatically measuring a deviation of a track of a series of predicted touchdown points from a preplanned track;
upon identifying an obstacle in the 3 dimensional images of the portion of the cable, computing a change in cable laying conditions to avoid the obstacle; and
automatically controlling the cable laying vessel, wherein controlling the cable laying vessel comprises sending a command signal to the cable laying vessel to alter the cable laying conditions based on the change, the command signal comprising altering a speed of the cable laying vessel.

17. The method of claim 16, wherein automatically calculating the 3 dimensional images of the portion of the cable and the portion of the seabed from the analysis further comprises:
automatically calculating a probable future track of touchdown points using a recorded series of touchdown points based on the analysis and the calculated series of three dimensional points to compare an image of the seabed to a predicted path of the touchdown points.

18. The method of claim 16, wherein the command signal to the vessel further alters a course of the vessel.

19. The method of claim 18, wherein alteration of course alters the track on which the cable is laid.

20. The method of claim 16, wherein the command signal to the vessel further alters a tension in the undersea line.

21. The method of claim 16, wherein the command signal further alters a rate that the cable is fed into the seabed.

* * * * *